US010480765B2

(12) United States Patent
Jayawardena

(10) Patent No.: US 10,480,765 B2
(45) Date of Patent: Nov. 19, 2019

(54) INTEGRATION OF SENSOR COMPONENTS WITH LIGHT FIXTURES IN HAZARDOUS ENVIRONMENTS

(71) Applicant: Adikaramge Asiri Jayawardena, Manlius, NY (US)

(72) Inventor: Adikaramge Asiri Jayawardena, Manlius, NY (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 1199 days.

(21) Appl. No.: 14/733,024

(22) Filed: Jun. 8, 2015

(65) Prior Publication Data
US 2016/0356474 A1 Dec. 8, 2016

(51) Int. Cl.
*F21V 25/10* (2006.01)
*F21V 25/12* (2006.01)
*F21V 23/04* (2006.01)
*H05B 37/02* (2006.01)
*H02H 9/00* (2006.01)

(52) U.S. Cl.
CPC .......... *F21V 25/10* (2013.01); *F21V 23/0442* (2013.01); *F21V 25/12* (2013.01); *H02H 9/008* (2013.01); *H05B 37/0218* (2013.01); *H05B 37/0227* (2013.01); *H05B 37/0272* (2013.01); *Y02B 20/46* (2013.01)

(58) Field of Classification Search
CPC ...... F21V 25/10; F21V 25/12; F21V 23/0442; H05B 37/02; H05B 37/0218; H05B 37/0227; H05B 37/0272; H02H 9/008; Y02B 20/46
See application file for complete search history.

(56) References Cited

U.S. PATENT DOCUMENTS 6,369,715 B2    4/2002  Bennett et al.
6,469,619 B1 *  10/2002  Mayercheck ........... E21F 17/18
                                                              340/321

(Continued)

FOREIGN PATENT DOCUMENTS

DE    102013103823    10/2014
EP    0997831 A2    5/2000

OTHER PUBLICATIONS

S. Surikov, International Search Report and Written Opinion issued in PCT/US2016/036019, completion date Aug. 25, 2016, dated Oct. 6, 2016, 8 pages, Federal Institute of Industrial Property, Moscow, Russia.

(Continued)

*Primary Examiner* — Jimmy T Vu
(74) *Attorney, Agent, or Firm* — King & Spalding LLP

(57) ABSTRACT

A light fixture located in a hazardous environment is described herein. The light fixture can include a housing having at least one wall that forms a cavity, where the housing meets applicable standards for the hazardous environment. The light fixture can also include a sensor assembly disposed within the cavity, where the sensor assembly includes a sensor power supply configured to generate power for an intrinsically safe sensor disposed outside the housing in the hazardous environment and a sensor control module configured to provide control for the intrinsically safe sensor. The light fixture can further include at least one light fixture component disposed within the housing.

15 Claims, 3 Drawing Sheets

(56) References Cited

U.S. PATENT DOCUMENTS

| | | |
|---|---|---|
| 6,822,431 B2 | 11/2004 | Masuda et al. |
| 7,285,782 B2 | 10/2007 | Schubert |
| 7,861,602 B2 | 1/2011 | Matsubara |
| 8,228,206 B2 | 7/2012 | Manahan |
| 8,381,576 B2 | 2/2013 | Schlichte et al. |
| 8,575,861 B1 | 11/2013 | Gordin et al. |
| 8,632,666 B2 | 1/2014 | Schlichte et al. |
| 8,729,833 B2 | 5/2014 | Chemel et al. |
| 8,841,859 B2 | 9/2014 | Chemel et al. |
| 2004/0113635 A1 | 6/2004 | Masuda et al. |
| 2005/0259416 A1 | 11/2005 | Gauna et al. |
| 2010/0283991 A1 | 11/2010 | Chrzan et al. |
| 2011/0194280 A1 | 8/2011 | Ruffin et al. |
| 2012/0040606 A1 | 2/2012 | Verfuerth |
| 2014/0204570 A1 | 7/2014 | Burmeister et al. |
| 2014/0252961 A1* | 9/2014 | Ramer ............... H05B 33/0842 315/151 |

OTHER PUBLICATIONS

Extended European Search Report issued in EP Application No. 16808087.7 dated Jan. 17, 2019, 8 pages.

\* cited by examiner

INTEGRATION OF SENSOR COMPONENTS WITH LIGHT FIXTURES IN HAZARDOUS ENVIRONMENTS

TECHNICAL FIELD

The present disclosure relates generally to sensors located in hazardous locations, and more particularly to systems, methods, and devices for integration of components of a sensor device with a light fixture in a hazardous environment.

BACKGROUND

In hazardous environments, electrical enclosures (such as sensor housings and light fixtures) are required to comply with a number of standards and regulations to ensure safety when operating equipment in such hazardous environments. Each electrical enclosure, even if part of the same system, must be intrinsically safe.

SUMMARY

In general, in one aspect, the disclosure relates to a light fixture located in a hazardous environment. The light fixture can include a housing having at least one wall that forms a cavity, where the housing meets applicable standards for the hazardous environment. The light fixture can also include a sensor assembly disposed within the cavity, and at least one light fixture component disposed within the housing. The sensor assembly of the light fixture can include a sensor power supply configured to generate power for an intrinsically safe sensor disposed outside the housing in the hazardous environment. The sensor assembly of the light fixture can also include a sensor control module configured to provide control for the intrinsically safe sensor.

In another aspect, the disclosure can generally relate to an intrinsically safe sensor device located in a hazardous environment. The intrinsically safe sensor can include a housing having at least one wall that forms a cavity, and sensor circuitry disposed within the cavity. The intrinsically safe sensor can also include a sensor coupled to the sensor circuitry, and at least one light fixture component disposed within the housing.

In yet another aspect, the disclosure can generally relate to an electrical system located in a hazardous environment. The electrical system can include a light fixture and an intrinsically safe sensor device electrically coupled to the light fixture. The light fixture of the electrical system can include a light fixture housing having at least one wall that forms a light fixture cavity, where the light fixture housing meets applicable standards for the hazardous environment. The light fixture of the electrical system can also include a sensor assembly disposed within the light fixture cavity, and at least one light fixture component. The sensor assembly of the light fixture of the electrical system can include a sensor power supply and a sensor control module. The intrinsically safe sensor device of the electrical system can include a sensor device housing having at least one wall that forms a sensor device cavity. The intrinsically safe sensor device of the electrical system can also include sensor circuitry disposed within the sensor device cavity, where the sensor circuitry is communicably coupled to the sensor assembly of the light fixture. The intrinsically safe sensor device of the electrical system can further include a sensor coupled to the sensor circuitry.

These and other aspects, objects, features, and embodiments will be apparent from the following description and the appended claims.

BRIEF DESCRIPTION OF THE DRAWINGS

The drawings illustrate only example embodiments and are therefore not to be considered limiting in scope, as the example embodiments may admit to other equally effective embodiments. The elements and features shown in the drawings are not necessarily to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical, elements.

DETAILED DESCRIPTION

Figure 1:
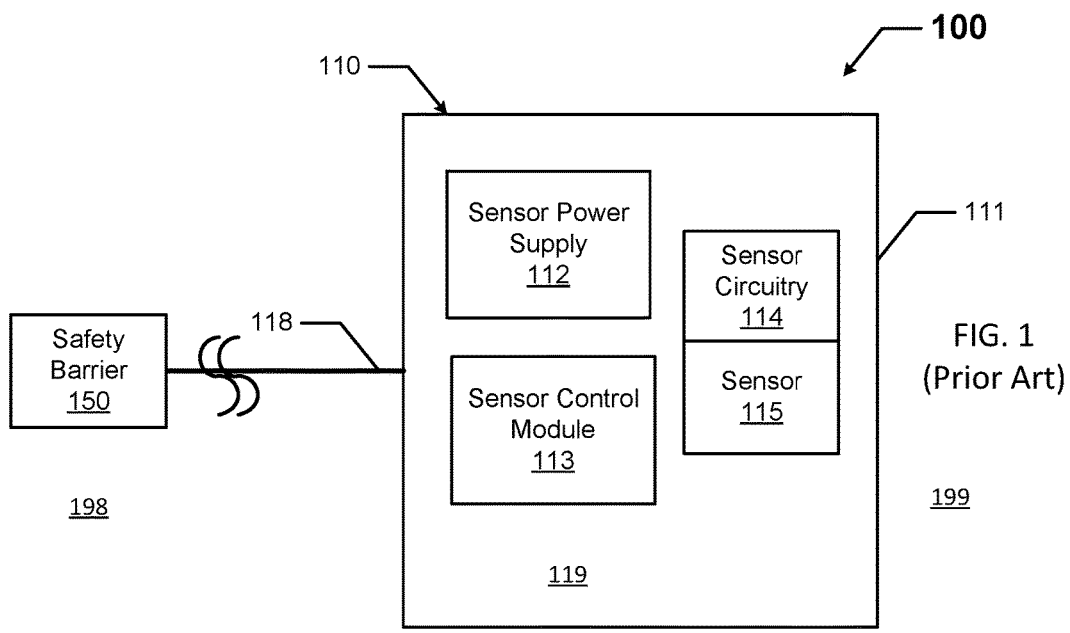
FIG. 1 shows a system diagram of a sensor located in a hazardous environment and that is currently used in the art.

In general, example embodiments provide systems, methods, and devices for integrating components of a sensor with a light fixture in a hazardous environment. Example systems that integrate components of a sensor with a light fixture in hazardous environments provide a number of benefits. Such benefits can include, but are not limited to, increased flexibility of the arrangement of sensors in hazardous environments, reduced power consumption, ease of maintenance, and compliance with industry standards that apply to enclosures in hazardous environments.

The example embodiments discussed herein can be used in any type of hazardous environment, including but not limited to an airplane hangar, a drilling rig (as for oil, gas, or water), a production rig (as for oil or gas), a refinery, a chemical plant, a power plant, a mining operation, a wastewater treatment facility, and a steel mill. A user may be any person that interacts with example systems that integrate components of a sensor with a light fixture in hazardous environments. Examples of a user may include, but are not limited to, an engineer, an electrician, an instrumentation and controls technician, a mechanic, an operator, a consultant, a contractor, and a manufacturer's representative.

The systems that integrate components of a sensor with a light fixture in hazardous environments (or components thereof, including sensors) described herein can be made of one or more of a number of suitable materials to allow the light fixture and the sensor to meet certain standards and/or regulations while also maintaining durability in light of the one or more conditions under which the light fixtures and sensors, including any other component of the system that couples a light fixture and a sensor, can be exposed. Examples of such materials can include, but are not limited to, aluminum, stainless steel, fiberglass, glass, plastic, ceramic, and rubber.

Example systems that integrate components of a sensor with a light fixture in hazardous environments, or portions thereof, described herein can be made from a single piece (as from a mold, injection mold, die cast, or extrusion process). In addition, or in the alternative, example systems that integrate components of a sensor with a light fixture in hazardous environments can be made from multiple pieces that are mechanically coupled to each other. In such a case, the multiple pieces can be mechanically coupled to each other using one or more of a number of coupling methods, including but not limited to epoxy, welding, fastening devices, compression fittings, mating threads, and slotted fittings. One or more pieces that are mechanically coupled to each other can be coupled to each other in one or more of a number of ways, including but not limited to fixedly, hingedly, removeably, slidably, and threadably.

Further, if a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three digit number and corresponding components in other figures have the identical last two digits.

In the foregoing figures showing example embodiments of systems that integrate components of a sensor with a light fixture in hazardous environments, one or more of the components shown may be omitted, repeated, and/or substituted. Accordingly, example embodiments of systems that integrate components of a sensor with a light fixture in hazardous environments should not be considered limited to the specific arrangements of components shown in any of the figures. For example, features shown in one or more figures or described with respect to one embodiment can be applied to another embodiment associated with a different figure or description. An example system can include a light fixture that wirelessly communicates with one sensor, while communicating with another sensor using wired technology.

As defined herein, an electrical enclosure is any type of cabinet or housing inside of which is disposed electrical and/or electronic equipment. Such electrical and/or electronic equipment can include, but is not limited to, a power source (e.g., a battery, a driver, a ballast), a sensor module, a safety barrier, a sensor, sensor circuitry, a light source, electrical cables, and electrical conductors. Examples of an electrical enclosure can include, but are not limited to, a housing for a light fixture, a housing for a sensor device, an electrical connector, a junction box, a motor control center, a breaker box, an electrical housing, a conduit, a control panel, an indicating panel, and a control cabinet.

In certain example embodiments, light fixtures and associated sensor devices to which example light fixtures are coupled are subject to meeting certain standards and/or requirements. For example, the National Electric Code (NEC), the National Electrical Manufacturers Association (NEMA), Underwriters Laboratories (UL), the International Electrotechnical Commission (IEC), and the Institute of Electrical and Electronics Engineers (IEEE) set standards as to electrical enclosures, wiring, and electrical connections. Use of example embodiments described herein meet (and/or allow a corresponding device to meet) such standards when required. In some (e.g., PV solar) applications, additional standards particular to that application may be met by the electrical enclosures that house portions of a sensor.

As used herein, the term "intrinsically safe" refers to a device (e.g., an example sensor device described herein) that is placed in a hazardous environment. To be intrinsically safe, the device uses a limited amount of electrical energy so that sparks cannot occur from a short circuit or failures that can cause an explosive atmosphere found in hazardous environments to ignite. A safety barrier, described below, is commonly used with an intrinsically safe device.

Example embodiments of systems that integrate components of a sensor with a light fixture in hazardous environments will be described more fully hereinafter with reference to the accompanying drawings, in which example embodiments of systems that integrate components of a sensor with a light fixture in hazardous environments are shown. Systems that integrate components of a sensor with a light fixture in hazardous environments may, however, be embodied in many different forms and should not be construed as limited to the example embodiments set forth herein. Rather, these example embodiments are provided so that this disclosure will be thorough and complete, and will fully convey the scope of systems that integrate components of a sensor with a light fixture in hazardous environments to those of ordinary skill in the art. Like, but not necessarily the same, elements (also sometimes called components) in the various figures are denoted by like reference numerals for consistency.

Terms such as "first", "second", and "within" are used merely to distinguish one component (or part of a component or state of a component) from another. Such terms are not meant to denote a preference or a particular orientation, and are not meant to limit embodiments of systems that integrate components of a sensor with a light fixture in hazardous environments. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

FIG. 1 shows a system diagram 100 that includes a sensor device 110 located in a hazardous environment 199 and that is currently used in the art. The sensor device 110 includes a housing 111 that forms a cavity 119. Within the cavity 119 is disposed a sensor power supply 112, a sensor control module 113, sensor circuitry 114, and a sensor 115. One or more electrical conductors 118 are coupled to the housing 111 to transmit signals (e.g., power signals, communication signals, control signals) to and receive signals from one or more components of the sensor device 110. Any of the components disposed in the housing 111 of the sensor device 110 can be combined with one or more other components or can be discrete from the other components.

The housing 111 is designed to comply with any applicable standards so that the sensor device 110 can be located in the hazardous environment 199. For example, if the hazardous environment 199 is an explosive environment, the housing 111 can be explosion-proof. An explosion-proof enclosure is an enclosure that is configured to contain an explosion that originates inside, or can propagate through, the enclosure. Further, the explosion-proof enclosure is configured to allow gases from inside the enclosure to escape across joints of the enclosure and cool as the gases exit the explosion-proof enclosure. The joints are also known as flame paths and exist where two surfaces (for example, the housing of an indicator light and an enclosure cover, or the housing of an indicator light and a light guide of the indicator light) meet and provide a path, from inside the explosion-proof enclosure to outside the explosion-proof enclosure, along which one or more gases may travel. A joint may be a mating of any two or more surfaces. Each surface may be any type of surface, including but not limited to a flat surface, a threaded surface, and a serrated surface.

National Electrical Manufacturers Association (NEMA) sets standards with which an enclosure must comply in order to qualify as an explosion-proof enclosure. Specifically, NEMA Type 7, Type 8, Type 9, and Type 10 enclosures set standards with which an explosion-proof enclosure within a hazardous location must comply. For example, a NEMA Type 7 standard applies to enclosures constructed for indoor use in certain hazardous locations. Hazardous locations may be defined by one or more of a number of authorities, including but not limited to the National Electric Code (e.g., Class 1, Division I) and Underwriters' Laboratories, Inc. (UL) (e.g., UL 1203). For example, a Class 1 hazardous area under the National Electric Code is an area in which flammable gases or vapors may be present in the air in sufficient quantities to be explosive.

The sensor power supply 112 provides power to one or more other components (e.g., sensor control module 113, sensor circuitry 114) of the sensor device 110. The sensor power supply 112 can include one or more of a number of single or multiple discrete components (e.g., transistor, diode, resistor), and/or a microprocessor. The sensor power supply 112 may include a printed circuit board, upon which the microprocessor and/or one or more discrete components are positioned.

The sensor power supply 112 can include one or more components (e.g., a transformer, a diode bridge, an inverter, a converter) that receives power (for example, through the electrical conductor 118) from a source external to the sensor device 110 and generates power of a type (e.g., alternating current, direct current) and level (e.g., 12V, 24V, 120V) that can be used by the other components of the sensor device 110. In addition, or in the alternative, the sensor power supply 112 can be a source of power in itself to provide signals to the other components of the sensor device 110. For example, the sensor power supply 112 can be a battery. As another example, the sensor power supply 112 can be a localized photovoltaic power system.

The sensor control module 113 of the sensor device 110 provides control, communication, and/or other similar signals to the sensor circuitry 114. Similarly, the sensor control module 113 can receive control, communication, and/or other similar signals from the sensor circuitry 114. The sensor control module 113 can control the sensor circuitry 114 automatically (for example, based on one or more algorithms stored in the sensor control module 113) and/or based on control, communication, and/or other similar signals received from another device through the electrical conductor 118. The sensor control module 113 may include a printed circuit board, upon which the microprocessor and/or one or more discrete components are positioned.

The sensor circuitry 114 is directly coupled to the sensor 115. The sensor circuitry 114 receives signals from the sensor control module 113 and/or the sensor power supply 112 and operates the sensor 115 based on those signals. The sensor circuitry 114 can monitor the operation of the sensor 115 and compensate or otherwise make adjustments so that the sensor 115 operates in accordance with its operational parameters.

The sensor 115 includes one or more sensing modules that measure some parameter. Examples of a parameter that a sensor 115 measures can include, but is not limited to, motion, an amount of ambient light, occupancy of a space, and an ambient temperature. Thus, examples of a sensor 115 can include a passive infrared (PIR) sensor, a photocell, and a resistance temperature detector. The parameter or parameters measured by the sensor 115 can be used to operate a light fixture or some other device that is coupled to the sensor device 110.

To make the sensor device 110 intrinsically safe, a safety barrier 150 is placed in a non-hazardous environment 198 and coupled to the sensor device 110. The safety barrier 150 provides protection (e.g., overvoltage protection, overcurrent protection) for one or more components of the sensor device 110. For example, the safety barrier 150 can limit the amount of power delivered to the sensor device 110 to reduce the risk of explosion, fire, or other adverse condition that can be caused by high amounts of power in the hazardous environment 199. The safety barrier 150 is a required component when the sensor device 110 is located in a hazardous environment 199. The safety barrier 150 can include one or more of a number of single or multiple discrete components (e.g., capacitor, inductor, transistor, diode, resistor, fuse), and/or a microprocessor. The sensor power supply 112 may include a printed circuit board, upon which the microprocessor and/or one or more discrete components are positioned.

If the sensor device 110 is used for a light fixture located in a hazardous environment 199, then the sensor device 110 currently used in the art is part of the light fixture. In such a case, a number of types of sensors (e.g., PIR sensors, photo sensor to monitor ambient light) cannot practically be used because such sensors operate most effectively when the sensor is located remotely. Otherwise, if the sensor device 110 is a device on its own in a hazardous environment 199, the sensor device 110 must be intrinsically safe. In other words, the power available to the sensor device 110 is limited to nonincendive levels so that sparks cannot occur from a short circuit or other similar failures that can cause an explosive atmosphere to ignite. In this way, the sensor device 110 can comply with applicable standards for electrical enclosures in the hazardous environment 199.

Figure 2:
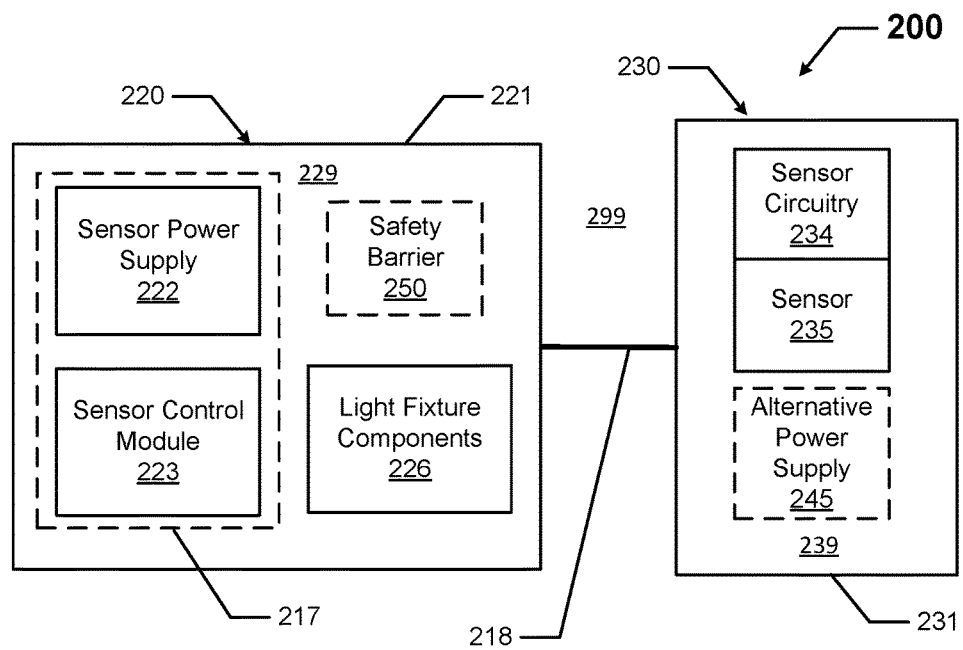
FIG. 2 shows a line diagram of a system, located in a hazardous environment, that includes a light fixture and a sensor device in accordance with certain example embodiments.

FIG. 2 shows a line diagram of a system 200, located in a hazardous environment 299, that includes a light fixture 220 and at least one sensor device 230 in accordance with certain example embodiments. Referring to FIGS. 1 and 2, the sensor device 230 must be intrinsically safe because the sensor device 230 is located in a hazardous environment 299 and is not disposed within the light fixture 220. To make the sensor device 230 intrinsically safe, a safety barrier (e.g., safety barrier 250) can be used to limit the power available to the sensor device 230. In this way, the sensor device 230 and the housing 221 of the light fixture 220 each comply with applicable standards for electrical enclosures in the hazardous environment 299.

In this case, one or more components of the sensor device 110 of FIG. 1 are removed from the sensor device 230 of FIG. 2 and inserted into the light fixture 220. In other words, one or more components of the sensor device that would normally be disposed in the housing of the sensor device are integrated into the light fixture 220 in certain example embodiments. More specifically, the flow of power and/or communication signals to and from the example sensor device 230 are provided through the safety barrier 250. When the sensor device 230 is intrinsically safe, the mechanical construction of the housing 231 and/or other components of the sensor device 230 are less important. By contrast, the housing 221 of the light fixture 220 relies heavily on its mechanical construction to safely and compliantly be placed in a hazardous environment 299.

Further, the electrical design of the intrinsically safe sensor device 230 leads to less complex mechanical design than would otherwise be required. Consequently, example embodiments allow for the use of more varied sensor devices (e.g., sensor device 230) in hazardous environments. In addition, example sensor devices 230 used in hazardous environments 299 can be manufactured at a lower cost with fewer materials and a more simplified electrical and mechanical design.

The light fixture 220 can include a housing 221 that forms a cavity 229. Within the cavity 229 can be disposed one or more of a number of components that are found in the sensor device 110 of FIG. 1. For example, as shown in FIG. 2, a sensor power supply 222, a sensor control module 223, and a safety barrier 250 are disposed in the cavity 229 of the housing 221 of the light fixture 220, where the sensor power supply 222, the sensor control module 223, and the safety barrier 250 of FIG. 2 are substantially similar to the sensor power supply 122, the sensor control module 123, and the safety barrier 150 of FIG. 1.

One or more of a number of light fixture components 226 can also be disposed within the cavity 229 formed by the housing 221 of the light fixture 220. The light fixture components 226 are typically found in a light fixture to allow the light fixture 220 to operate. Examples of such light fixture components 226 can include, but are not limited to, a power source (also called, for example, a driver or a ballast), a control module, a light source, a heat sink, and electrical conductors.

In certain example embodiments, the sensor power supply 222, the sensor control module 223, and/or the safety barrier 250 can be the same as, or integrated with, a power supply, a control module, and/or a safety barrier (e.g., light fixture components 226) that are normally found in a light fixture located in the hazardous environment 299. In other words, as an example, the sensor power supply 222 can be the same as, or integrated with, a power supply (e.g., part of the light fixture components 226) of the light fixture 220. By combining one or more of the components of a sensor module with one or more components within a light fixture, efficiencies in power consumption, maintenance, materials, and operations can be realized. In such a case, when the sensor device 230 and the light fixture 220 are located in a hazardous environment (e.g., hazardous environment 299), the sensor device 230 and the light fixture 220 can both comply with one or more standards for the hazardous environment.

As stated above, the housing 221 of the light fixture 220 is designed to comply with any applicable standards so that the light fixture 220 can be located in the hazardous environment 299. One or more electrical conductors 218 are coupled to the housing 221 of the light fixture 220 (and more specifically to the safety barrier 250 within the housing 221 of the light fixture 220) to transmit signals (e.g., power signals, communication signals, control signals) to and receive signals from the sensor device 230. Any of the components disposed in the housing 221 of the light fixture 220 can be combined with one or more other components or can be discrete from the other components. The combination of the sensor power supply 222 and the sensor control module 223 can be called a sensor assembly 217.

Since some components normally found in the sensor device are disposed in the cavity 229 formed by the housing 221 of the light fixture 220, there are fewer components of the sensor device 230 disposed in the cavity 239 formed by the housing 231 compared to the number of components disposed in the cavity 119 formed by the housing 111 of the sensor device 110 of FIG. 1. In certain example embodiments, only the sensor circuitry 234 and the sensor 235 are disposed within the cavity 239 formed by the housing 231 of the sensor device 230. In other cases, as shown in FIG. 2, one or more optional alternative power supplies 245 (e.g., batteries) can also be disposed within the cavity 239 formed by the housing 231 of the sensor device 230. The sensor circuitry 234 and the sensor 235 of FIG. 2 are substantially the same as the sensor circuitry 114 and the sensor 115 of FIG. 1.

The housing 231 of the sensing device 230 is designed to comply with any applicable standards so that the sensing device 230 can be located in the hazardous environment 299. One or more electrical conductors 218 are coupled to the housing 231 of the sensing device 230 to transmit signals (e.g., power signals, communication signals, control signals) to and receive signals from the light fixture 220. Specifically, the electrical conductors 218 can be used to transmit signals between the sensor assembly 217 to the sensor device 230. By removing the sensor assembly 217 from the sensor device 230 and making the sensor assembly 217 part of the light fixture 220, the effectiveness and range of parameters measured by the sensor device 230 can be greatly improved.

For example, as discussed above, a PIR sensor has no benefit when it is located within a fixture, and a photo sensor cannot be used to monitor ambient light when the photo sensor is enclosed inside the light fixture. However, using example embodiments, the sensor device 230 can be a photo sensor or a photo sensor that are remote devices relative to the light fixture 220 within the hazardous environment 299. Further, since sensor device 230 consumes less power relative to a sensor device used in the current art, which qualifies the sensor device 230 as intrinsically safe, the complexity of the mechanical and electrical components of and within the housing 221 is reduced relative to a sensor device used in the current art. As a result, a sensor device 230 can be made using widely used (less expensive) materials relative to more expensive materials used for sensor devices used in the current art for the hazardous environment 299.

Figure 3:
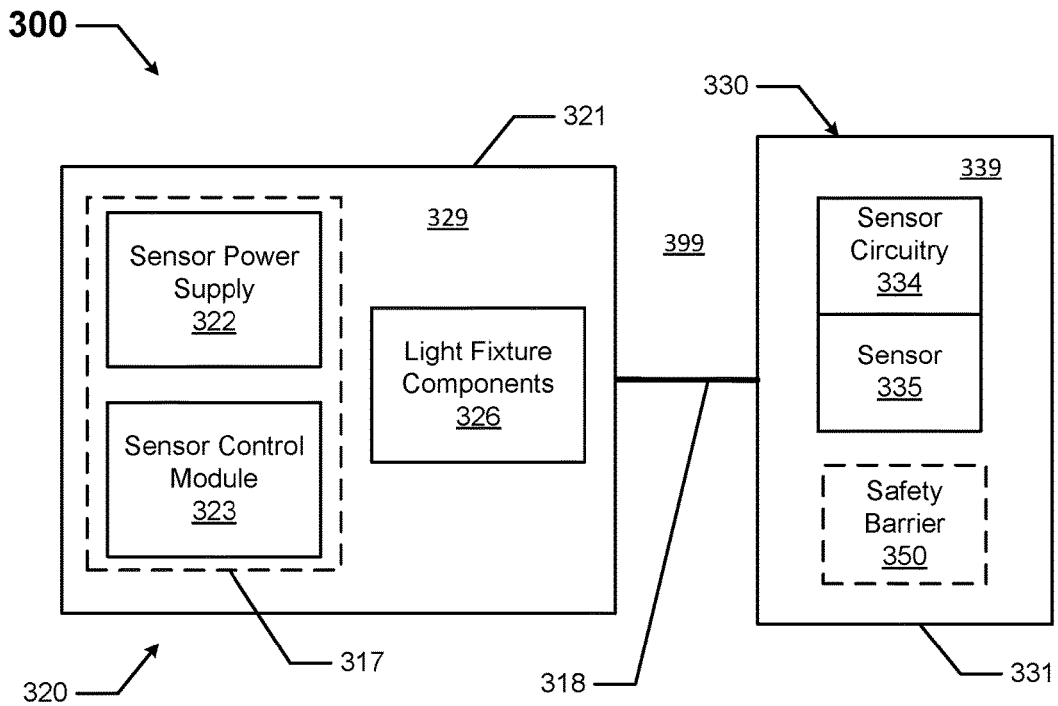
FIG. 3 shows a line diagram of another system, located in a hazardous environment, that includes a light fixture and a sensor device in accordance with certain example embodiments.

FIG. 3 shows a line diagram of another system 300, located in a hazardous environment 399, that includes a light fixture 320 and at least one sensor device 330 in accordance with certain example embodiments. The system 300 of FIG. 3 is substantially the same as the system 200 of FIG. 2, except as described below. Specifically, the location of the safety barrier 350 is now disposed in the cavity 339 formed by the housing 331 of the sensor device 330 rather than in the cavity 329 formed by the housing 321 of the light fixture 320. In such a case, the light fixture 320 can have its own safety barrier as part of the light fixture components 326. Again, the sensor device 330 of FIG. 3 is intrinsically safe. As a result, the sensor device 330 and the housing 321 of the light fixture 320 each comply with applicable standards for electrical enclosures in the hazardous environment 399.

Figure 4:
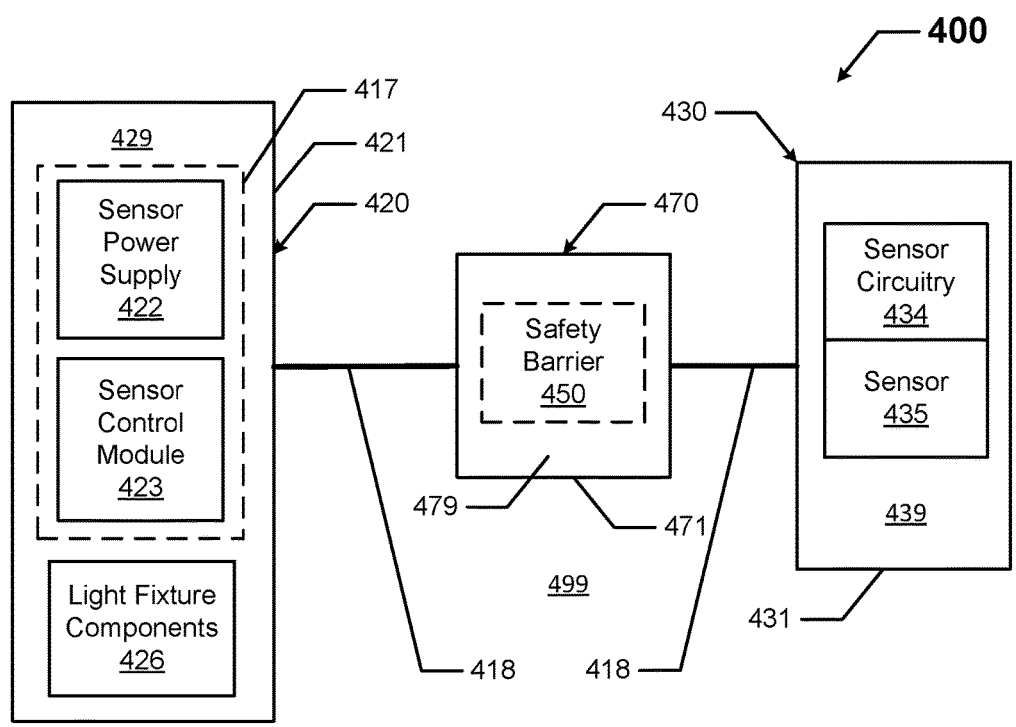
FIG. 4 shows a line diagram of yet another system, located in a hazardous environment, that includes a light fixture and a sensor device in accordance with certain example embodiments.

FIG. 4 shows a line diagram of yet another system 400, located in a hazardous environment 499, that includes a light fixture 420 and at least one sensor device 430 in accordance with certain example embodiments. The system 400 of FIG. 4 is substantially the same as the system 300 of FIG. 3, except as described below. Specifically, the location of the safety barrier 450 is now disposed outside of both the sensor device 430 and the light fixture 420. For example, as shown in FIG. 4, the safety barrier 450 can be disposed in the cavity 479 formed by a housing 471 of another electrical enclosure 470. In such a case, the electrical enclosure 470, when located in a hazardous environment (e.g., hazardous environment 499), can comply with applicable standards for electrical enclosures in the hazardous environment 499. Similarly, the sensor device 430 of FIG. 4 is intrinsically safe. As a result, the sensor device 430 and the housing 421 of the light fixture 420 each comply with applicable standards for electrical enclosures in the hazardous environment 499. The example system 400 shown in FIG. 4 can be used, for example, when there is not enough room in the cavity 429 of the housing 421 of the light fixture 420 for the safety barrier 450.

Figure 5:
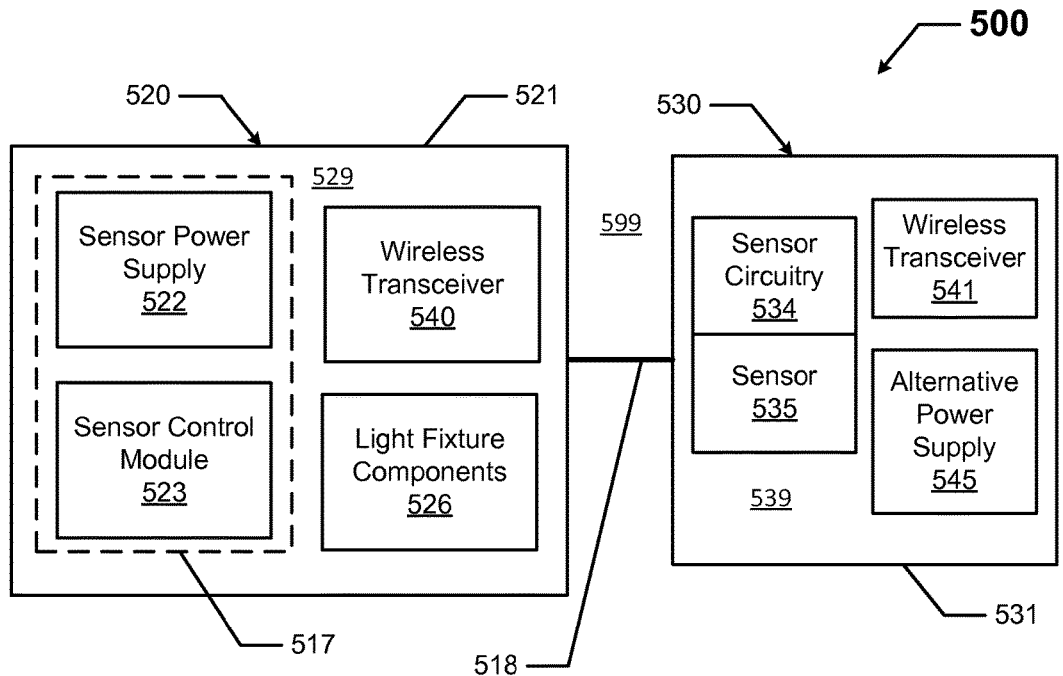
FIG. 5 shows a line diagram of still another system, located in a hazardous environment, that includes a light fixture and a sensor device in accordance with certain example embodiments.

FIG. 5 shows a line diagram of still another system 500, located in a hazardous environment 599, that includes a light fixture 520 and at least one sensor device 530 in accordance with certain example embodiments. The system 500 of FIG. 5 is substantially the same as the system 400 of FIG. 4, except as described below. Specifically, the optional safety barrier is not included in the system 500 of FIG. 5. In addition, the light fixture 520 can include a wireless transceiver 540 (in this case, disposed at least in part within the cavity 529 formed by the housing 521 of the light fixture 520). The wireless transceiver 540 can send and/or receive control and/or communication signals. The wireless transceiver 540 can be configured in such a way that the control and/or communication signals sent and/or received by the wireless transceiver 540 can be received and/or sent by another wireless transceiver (e.g., wireless transceiver 541).

By using the wireless transceiver 540, one or more of the electrical conductors used in previously-discussed example embodiments can be reduced or eliminated. The wireless transceiver 540 can use any type of wireless technology in sending and receiving signals. Such wireless technology can include, but is not limited to, Wi-Fi, visible light communication, cellular networking, and Bluetooth. The wireless transceiver 540 can use one or more of any number of suitable communication protocols (e.g., ISA100, HART) when sending and/or receiving signals.

In addition, the sensor device 530 can include a wireless transceiver 541 (in this case, disposed at least in part within the cavity 539 formed by the housing 531 of the sensor device 530). The wireless transceiver 541 can send and/or receive control and/or communication signals. The wireless transceiver 541 can be configured in such a way that the control and/or communication signals sent and/or received by the wireless transceiver 541 can be received and/or sent by another wireless transceiver (e.g., wireless transceiver 540). As with the wireless transceiver 540, the wireless transceiver 541 can use any type of wireless technology in sending and receiving signals. The wireless technology and communication protocol used by the wireless transceiver 541 can be suitable to communicate with the wireless transceiver 540.

In certain example embodiments, the light fixture 520 and/or at least one of the sensor devices 530 of the system 500 can include an alternative power supply 545. For example, as shown in FIG. 5, the sensor device 530 can include an alternative power supply 545. The alternative power supply 545 can serve as a secondary source of power if there is an interruption in power delivered by the sensor power supply 522. Alternatively, the alternative power supply 545 can serve as a primary source of power, eliminating the requirement to have a power cable (an electrical conductor 518) from the light fixture 520 to the sensor device 530 and also to a safety barrier. The alternative power supply 545 can be any type of power source, including but not limited to a battery and a PV solar system. In some cases, power delivered by the sensor power supply 522 can be used, in addition to providing power to one or more components of the sensor device 530, to charge the alternative power supply 545 when the alternative power supply 545 is an energy storage device (e.g., a battery).

Figure 6:
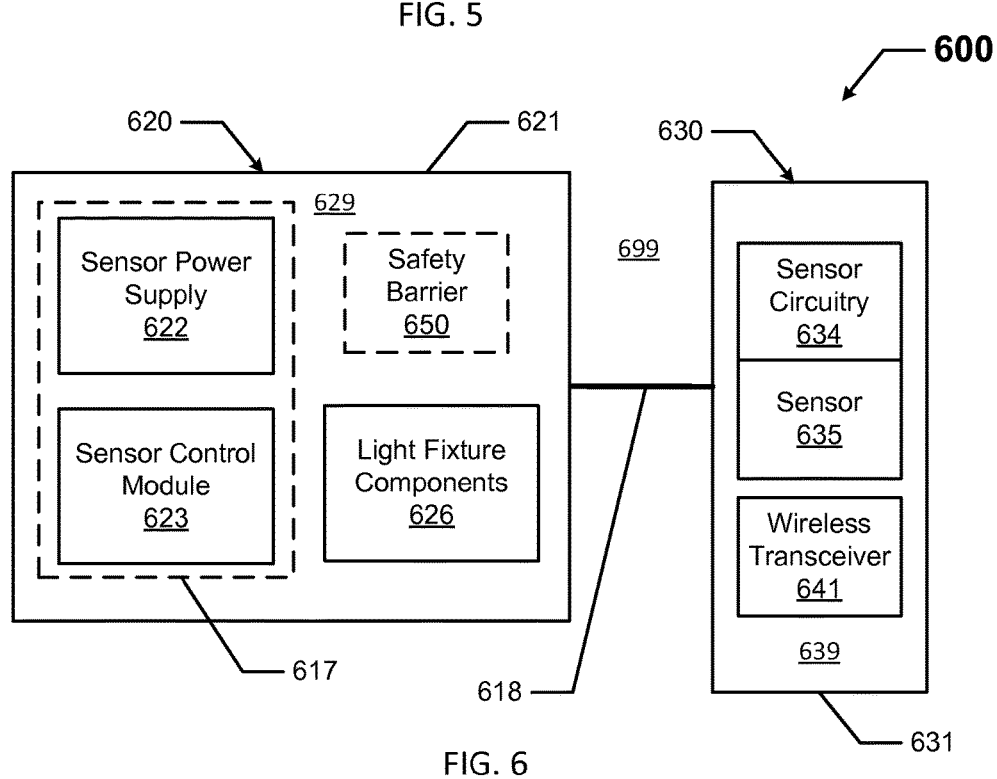
FIG. 6 shows a line diagram of yet another system, located in a hazardous environment, that includes a light fixture and a sensor device in accordance with certain example embodiments.

FIG. 6 shows a line diagram of yet another system 600, located in a hazardous environment 699, that includes a light fixture 620 and at least one sensor device 630 in accordance with certain example embodiments. The system 600 of FIG. 6 is substantially the same as the system 200 of FIG. 2, except as described below. Specifically, the sensor device 630 of FIG. 6 includes a wireless transceiver 641, which can be substantially similar to the wireless transceiver 541 described above.

Example embodiments provide for integration of components of a sensor device with a light fixture in a hazardous environment. Specifically, certain example embodiments allow for a sensor assembly (which can include a sensor power supply and a sensor control module) to be removed from the housing of the sensor device and placed within the housing of a light fixture. In such a case, both the housing of the sensor device and the housing of the light fixture can comply with one or more applicable standards for hazardous environments. Communication between the sensor assembly in the light fixture and the remaining components of the sensor device in the housing of the sensor device can be conducted using wired and/or wireless technology.

Example embodiments allow for more flexibility in terms of placement and operation of sensor devices used for a light fixture. Example embodiments can result in lower power usage and more efficient communication between a light fixture and associated sensor devices. A safety barrier disposed between the sensor assembly and the remainder of components of the sensor device, disposed within the housing of the sensor device, can be used to improve safety practices and help ensure that the light fixture and/or the sensor device comply with applicable standards for hazardous environments.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A light fixture located in a hazardous environment, the light fixture comprising:
a housing comprising at least one wall that forms a cavity, wherein the housing meets applicable standards for the hazardous environment;

a sensor assembly disposed within the cavity, wherein the sensor assembly comprises:
 a sensor power supply configured to generate an amount of power for an intrinsically safe sensor disposed outside the housing in the hazardous environment, wherein the amount of power is limited so that arcing and other sources of ignition do not occur during a short circuit or other electrical failure; and
 a sensor control module configured to provide control for the intrinsically safe sensor; and
at least one light fixture component disposed within the housing.

2. The light fixture of claim 1, further comprising:
a safety barrier disposed within the housing, wherein the safety barrier is disposed between the sensor assembly and the intrinsically safe sensor.

3. The light fixture of claim 1, further comprising:
at least one electrical conductor comprising a first end and a second end, wherein the first end is coupled to the sensor assembly, and wherein the second end is configured to couple to the intrinsically safe sensor.

4. An intrinsically safe sensor device located in a hazardous environment and coupled to a light fixture, the intrinsically safe sensor device comprising:
 a housing comprising at least one wall that forms a cavity, wherein the housing is configured to be coupled to the light fixture;
 sensor circuitry disposed within the cavity; and
 a sensor coupled to the sensor circuitry,
 wherein the sensor circuitry is configured to be coupled to a sensor assembly disposed in the light fixture.

5. The intrinsically safe sensor device of claim 4, wherein the sensor assembly comprises a sensor power supply and a sensor control source.

6. The intrinsically safe sensor device of claim 4, further comprising:
 a safety barrier disposed within the housing, wherein the safety barrier is coupled to the sensor circuitry, and wherein the safety barrier is configured to be further coupled to the sensor assembly disposed in the light fixture.

7. The intrinsically safe sensor device of claim 4, further comprising:
 at least one electrical conductor comprising a first end and a second end, wherein the first end is coupled to the sensor circuitry, and wherein the second end is configured to couple to the sensor assembly disposed in the light fixture located in the hazardous environment.

8. The intrinsically safe sensor device of claim 4, wherein the sensor measures at least one parameter that is used to operate the light fixture.

9. The intrinsically safe sensor device of claim 4, further comprising:
 an energy storage device disposed within the housing, wherein the energy storage device is configured to receive energy from the light fixture.

10. An electrical system located in a hazardous environment, the electrical system comprising:
 a light fixture, comprising:
  a light fixture housing comprising at least one wall that forms a light fixture cavity, wherein the light fixture housing meets applicable standards for the hazardous environment;
  a sensor assembly disposed within the light fixture cavity, wherein the sensor assembly comprises:
   a sensor power supply; and
   a sensor control module; and
  at least one light fixture component; and
 an intrinsically safe sensor device electrically coupled to the light fixture, wherein the intrinsically safe sensor device comprises:
  a sensor device housing comprising at least one wall that forms a sensor device cavity;
  sensor circuitry disposed within the sensor device cavity, wherein the sensor circuitry is communicably coupled to the sensor assembly of the light fixture: and
  a sensor coupled to the sensor circuitry.

11. The electrical system of claim 10, further comprising:
 a safety barrier disposed between the sensor assembly and the intrinsically safe sensor.

12. The electrical system of claim 11, wherein the safety barrier is disposed within the light fixture cavity of the light fixture.

13. The electrical system of claim 11, wherein the safety barrier is disposed within the sensor device cavity of the sensor device.

14. The electrical system of claim 11, wherein the safety barrier provides overvoltage and overcurrent protection.

15. The electrical system of claim 10, wherein the sensor is at least one selected from a group consisting of a passive infrared sensor, a photocell, and a resistance temperature detector.

\* \* \* \* \*